United States Patent Office 2,946,042
Patented July 19, 1960

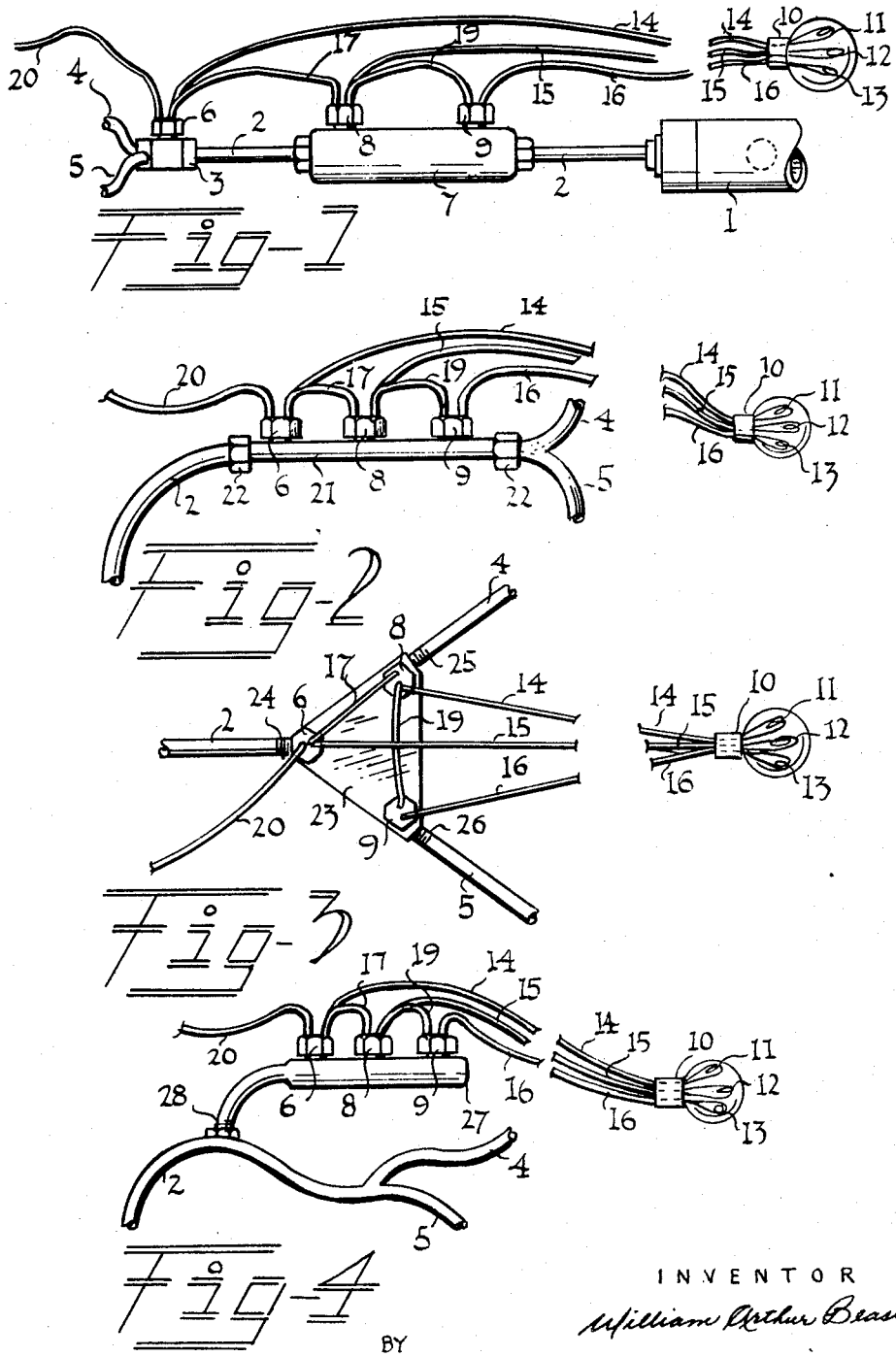

2,946,042
CAUTIONARY SIGNAL FOR AUTOMOTIVE VEHICLES

William Arthur Beasley, 13119 132 Ave., Edmonton, Alberta, Canada

Filed June 19, 1958, Ser. No. 743,087

2 Claims. (Cl. 340—69)

This device relates generally to signal light apparatus and particularly to signalling apparatus located at the rear of an automotive vehicle to indicate the braking of the automobile.

Apparatus to indicate the application of brakes to an automotive vehicle has now been more or less standardized with red lights that are switched on by a pressure actuated switch in communication with the hydraulic braking system. As the brake pedal is depressed, the increasing pressure in the hydraulic system closes the switch and lights the light. However, the application of the signal brake light does not indicate to a following vehicle whether the vehicle ahead is being braked lightly or has had to stop quickly and many collisions have occurred because the following driver has not had sufficient warning and has not been able to brake his vehicle in time.

It is, therefore, the principal object of this device to provide an indication of the degree of brake application to give the driver of a following vehicle sufficient warning to enable him to apply his own brakes and avoid a collision.

An additional object is to provide a cautionary signal of this type that does not require any major mechanical modification to the braking system and that may be included in the braking system with a minimum of time and effort.

In broadly descriptive terms, my device comprises a plurality of stop light switches such as are commonly used in association with the hydraulic braking system of the automobile to actuate a stop light. These switches are simply a small pressure actuated switch that are interconnected with the hydraulic brake system and are actuated whenever the pressure in the hydraulic system exceeds a predetermined point.

In my improved cautionary signalling system, I utilize an electric light incorporating three separate filaments, or, if desired, I utilize three separate lights. Interconnected with the hydraulic braking system of the automobile, I have three stop light switches that are adjusted to operate at, for example, 100 pounds', 750 pounds' and 1500 pounds' pressure in the hydraulic braking system. In addition, I have wired the stop light switches in series so that the second and third lights or filaments in the electric light cannot be lit until the previous stop light switch has closed.

In a system constructed in this fashion and when a driver depressed his brake pedal for only moderate braking, the pressure in the system would not reach 750 pounds and only the first filament or light would be lit. Should it be required to brake somewhat more severely, the pressure in the system might rise to approximately the 1000 or slightly greater poundage at which time the first filament or light would light and when the pressure had reached 750 pounds, the second filament or light would be lit. Should it be necessary to brake the vehicle severely, the three filaments would light in succession as the pressure in the system reached the point at which the stop light switches would close. Obviously, the following driver would notice the one light lighting, which would denote only moderate braking and could slow his vehicle sufficiently to stop or decrease his speed as the case may be. Should the following driver, however, notice the succeeding filaments light, he would know that the car in front was being braked severely and he would have sufficient warning to stop his own vehicle in time to avoid a collision.

Additional objects and advantages of my device will be apparent to those skilled in the art when the following specification is read in the light of the attached drawings. While I will describe my invention with a certain degree of particularity, it should be understood that the information disclosed therein is by way of example and illustration only and is not to be construed as a limitation.

In drawings illustrating preferred embodiments and wherein like numbers refer to like or similar parts:

Figure 1 is a broken away side view showing one embodiment of my device.

Figure 2 is another broken away side view illustrating another embodiment of my device.

Figure 3 is a top plan view again broken away and illustrating a further embodiment.

Figure 4 is a broken away side view illustrating an additional embodiment.

With reference now to the drawings and in particular, Figure 1, there is shown a master brake cylinder 1 from a hydraulic braking system and, in the ordinary course of events, a hydraulic line 2 would lead from the cylinder through a switch adapter 3 to the front brake line 4 and rear brake line 5. In the ordinary course of events, the stop light switch 6 would be connected to the standard vehicle stop light and any increase in pressure in the master cylinder 1 would close the stop light switch 6 and light the vehicle stop light. To modify this device in accordance with my invention, I provide an additional adapter 7 which is coupled into the line 2 and which mounts additional stop light switches 8 and 9.

The brake lights of the vehicle are now modified in the form of one light bulb 10 which includes separate filaments 11, 12 and 13, connected to wiring 14, 15 and 16 respectively. In wiring the stop lights, the stop light 6 is connected to the wire 14, the stop light 8 to the wire 15 and the stop light 9 to the wire 16. In addition, the switches 6 and 8 are interconnected through the wire 17 and the switches 8 and 9 interconnected through the wire 19 with the switch 6 also connected through the wire 20 to a source of electric current, as for example, the vehicle storage battery.

In this case, as hydraulic pressure in the brake system is increased, the switch 6 would close firstly and this would light the filament 11. Further pressure increase to 750 pounds, or whichever point it was desired, the switch 8 would be actuated and the filament 12 would then light. Additional pressure in the line to a desired point would then close the switch 9 to light the filament 13 and it will be obvious that as these filaments were lit in succession, the brilliance of the light 10 as seen by a following driver would increase and would provide warning.

As seen in Figure 2 in the drawings, the switches 6, 8 and 9 are all attached to a single adapter 21 which is interconnected in the line 2 by the nuts 22 or like means and thereafter the switches would operate as described.

In Figure 3, the switches are mounted on a triangular adapter unit 23 with the line 2 being threaded or otherwise attached as indicated at 24 with the lines 4 and 5 similarly attached at 25 and 26 respectively.

Again in Figure 4 in the drawings, a single adapter 27 is connected into the line 2 as indicated at 28 to receive pressure from the line and with switches 6, 8 and 9 to operate as described previously.

It will now be realized that I have provided a simple, low cost cautionary apparatus for use with automotive vehicles whose use will aid materially in reducing the number of tailend collisions that, in most cases, are brought about by the following driver not being aware that the vehicle in front was stopping quickly.

What I claim as my invention is:

1. In an automotive vehicle having a hydraulic braking system with a manually operable brake pedal to increase pressure in the hydraulic braking system and a source of electric current a cautionary signal for such automotive vehicle comprising electric brake lights each having a plurality of separate filaments therein, the plurality of pressure actuated switches each adapted to be actuated at different pressures, such switches connected in the said hydraulic braking system to be actuated by pressure in such system, electrical connections from each of the said switches to one of the filaments in the said electric brake lights and electrical connections from the said electric brake lights and switches to the said source of electric current whereby actuation of the switches will light the filaments in the electric brake lights.

2. The cautionary signal as claimed in claim 1 wherein the said electric brake lights include a plurality of lights each with a separate filament therein.

References Cited in the file of this patent

UNITED STATES PATENTS

| | | |
|---|---|---|
| 2,359,371 | Lawson | Oct. 3, 1944 |
| 2,566,545 | Alcoriza | Sept. 4, 1951 |

FOREIGN PATENTS

| | | |
|---|---|---|
| 13,846 | Great Britain | of 1912 |
| 283,620 | Great Britain | Jan. 9, 1928 |